United States Patent [19]

LaBounty

[11] 4,382,625
[45] May 10, 1983

[54] GRAPPLE SHEAR

[76] Inventor: Roy E. LaBounty, 1607-8th Ave., Two Harbors, Minn. 55616

[21] Appl. No.: 224,663

[22] Filed: Jan. 13, 1981

[51] Int. Cl.³ .............................................. B66C 1/10
[52] U.S. Cl. .................................... 294/104; 414/740; 30/134
[58] Field of Search ................ 294/103 R, 88, 68, 69, 294/104, 105, 106, 86 R, 118, 119; 414/740, 741, 739, 738; 30/134, 249, 258, 228

[56] References Cited

U.S. PATENT DOCUMENTS 3,516,158 6/1970 Ferrentino ............................ 30/134
3,567,050 3/1971 Pasquazzi et al. .................. 294/104
4,198,747 4/1980 LaBounty ........................... 414/740

Primary Examiner—James B. Marbert
Attorney, Agent, or Firm—Peterson, Palmatier, Sturm, Sjoquist & Baker, Ltd.

[57] ABSTRACT

A grapple shear having a lower jaw with three widely spaced forwardly projecting tines, the outer tines having upper ends mounting the upper jaw with a pair of tines to swing into interleaving relation with the tines of the lower jaw, the outer tines of the lower jaw having forwardly opening angular bights, a swingable shear blade on the central tine of the lower jaw which carries an upright mast and a hydraulic ram on the top of the mast and driving the shear blade downwardly in a cutting motion.

9 Claims, 5 Drawing Figures

U.S. Patent May 10, 1983 Sheet 1 of 2 4,382,625
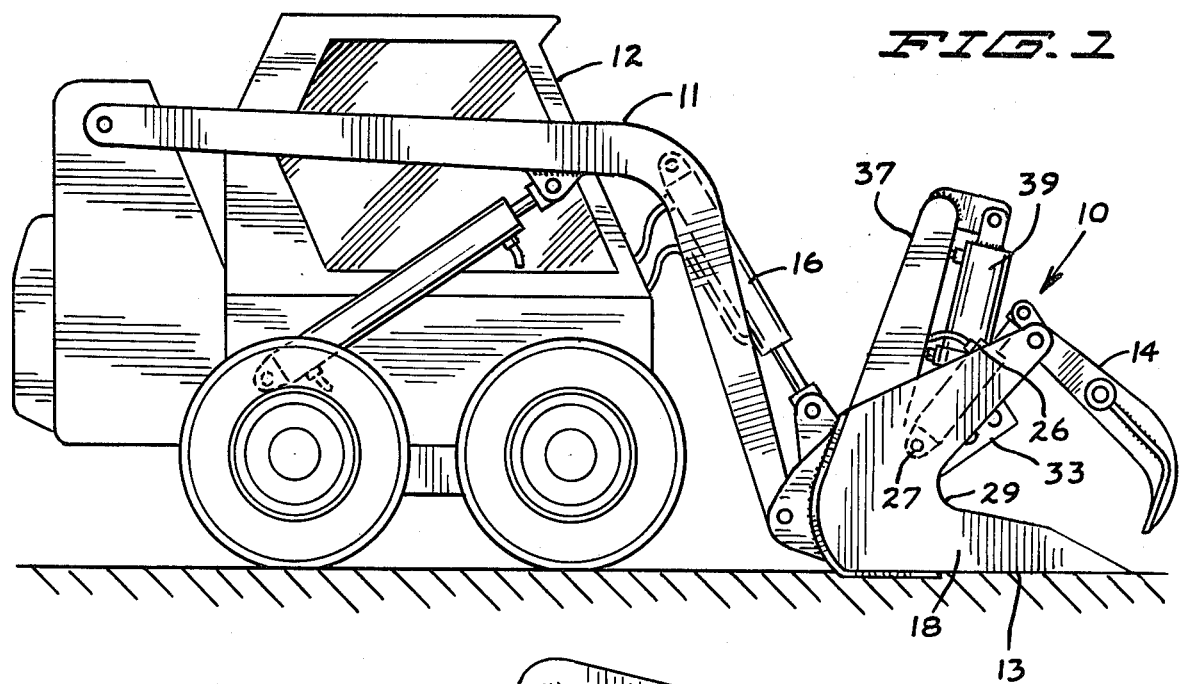
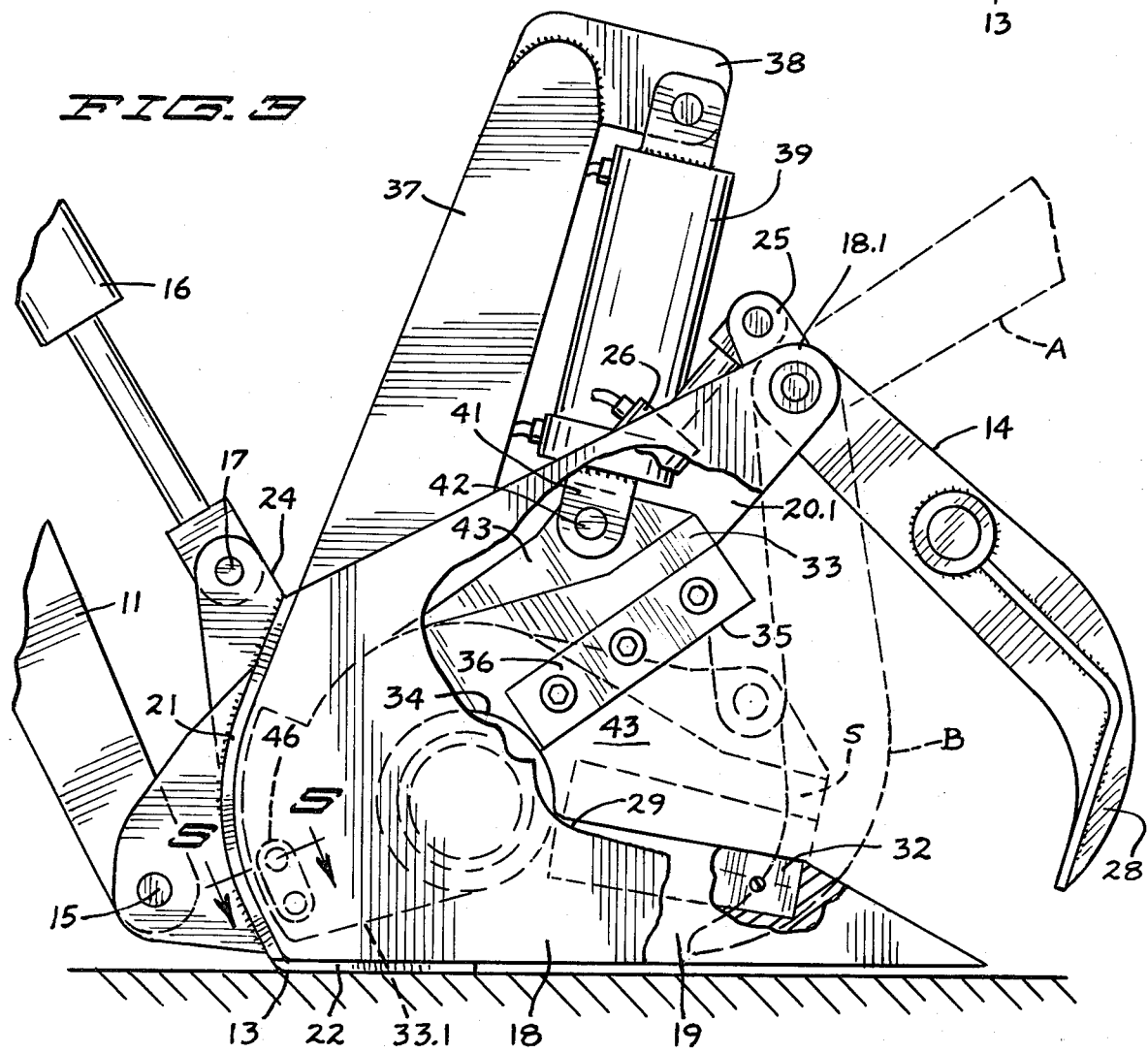

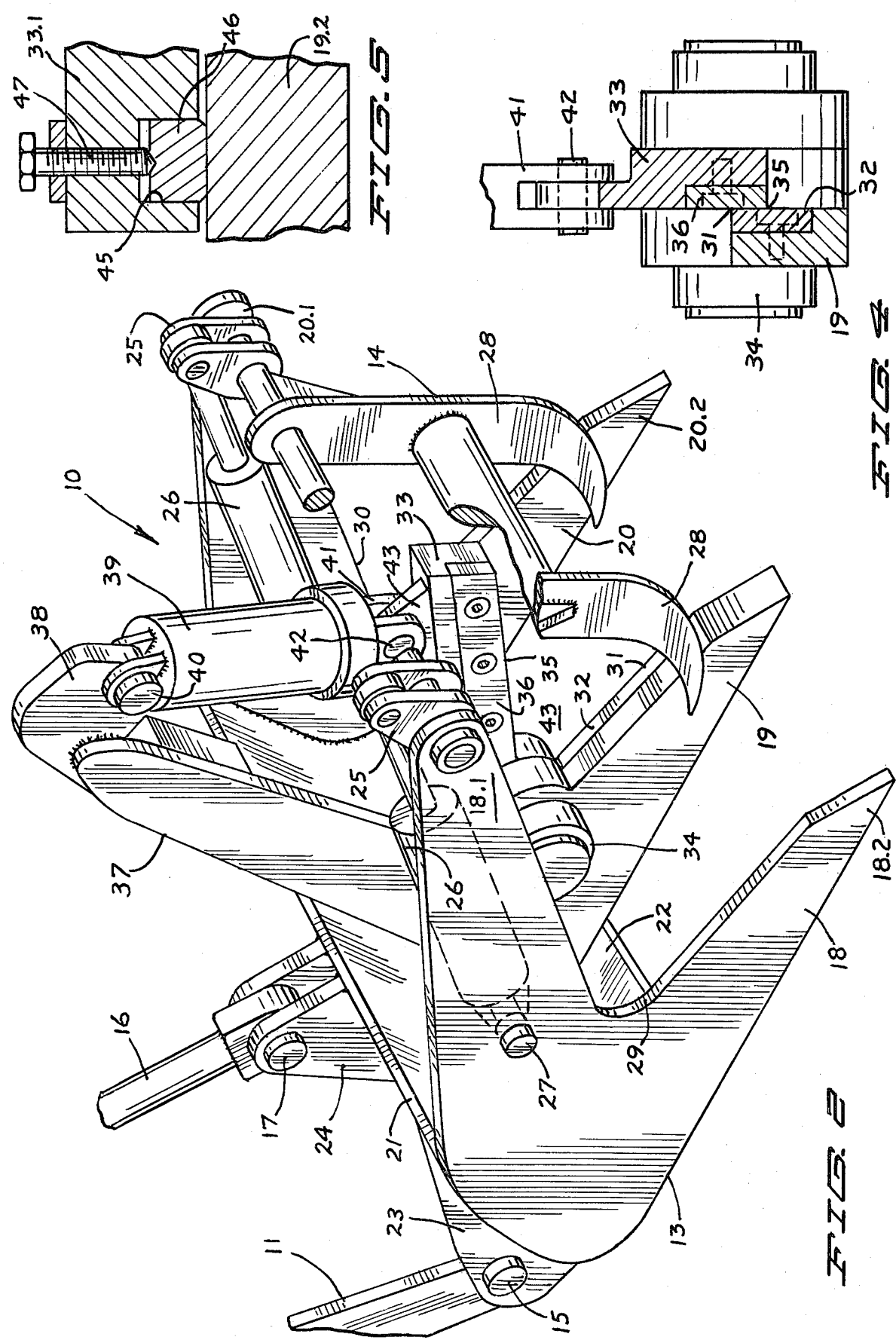

GRAPPLE SHEAR

This invention relates to a grapple shear suitable for use on a tractor or another vehicle having a boom.

BACKGROUND OF THE INVENTION

Handling of scrap materials has been made easier and more effective through the use of grapples on the boom of a backhoe. These grapples, with a stationary or minimally moving lower jaw, and a swinging top jaw, are effective in tearing down buildings, clearing debris at construction sites, moving and loading scrap metal including wrecked auto bodies around a scrap salvage yard.

For removing rubber tires from wrecked auto bodies, such grapples have been fitted with shears on the back side of the lower jaws. Such shears are effective to punch through steel wheel rims and cut through the rubber tires and through the steel cables in the tire beads so that the hand work in handling such auto bodies is minimized. It has been found that after an auto body has been correctly positioned by the grapple, the shear on the back side of the lower grapple jaw can actually clip through the frame of the auto body and effectively cut the body into two pieces.

It should be recognized that although auto bodies exist in substantial numbers in a metal reprocessing scrap yard, and require significant amounts of attention, metal scrap also exists in many other forms. A few of these include steel, copper and aluminum wire and cable; structural steel in the form of channels, pillars, I-beams, angle irons, and lattice steel joists; castings of innumerable shapes, forms and sizes, and materials; and pipes and ducts of steel, cast iron, copper and other materials, all in a wide variety of sizes and lengths.

Wire and cable is particularly difficult to handle in a reprocessing yard. Substantial amounts of such wire and cable is scrap from power transmission lines, and exists on large spools which are to be salvaged and reused. Such transmission line wire is often one inch to one and one half inches in diameter and may be stranded copper or aluminum with steel core strands. It is extremely stiff.

Also large quantities of such wire and cable exists in the form of tangled bundles or heaps. Reprocessing requires that all such wire and cable cut into six to ten foot lengths for feeding into a reprocessing machine.

Previously, such scrap wire and cable has been largely handled manually. Workmen with hand operated bolt cutters have cut the wire and cable into manageable lengths. Of course, the cost of such labor adds significantly to the cost of scrap reprocessing.

Although lengths of structural steel and pipes have been clipped into manageable pieces by known shears, prepositioning of the lengths for shears has always been a problem so that the shears can effectively exert the necessary amount of cutting force.

BRIEF DESCRIPTION OF DRAWINGS

FIG. 1 is a side elevation view of the invention mounted on a rubber tired tractor.

FIG. 2 is a perspective view of the grapple shear viewed from the front.

FIG. 3 is a enlarged side elevation view partly broken away for clarity of detail.

FIG. 4 is a detailed section view taken approximately at 4—4 in FIG. 3.

FIG. 5 is an enlarged detail section view taken at 5—5 in FIG. 3.

SUMMARY OF THE INVENTION

An object of the invention is to provide a new and improved grapple shear of simple and inexpensive construction and operation for cutting lengths of metal scrap into manageable lengths for reprocessing.

Another object of the invention is the provision of a novel grapple shear which is particularly suited for use as an attachment for a small and highly maneuverable rubber tired tractor for handling and reducing lengths of metal scrap in the oftentimes cramped spaces of a metal reprocessing yard.

A further object of the invention is to provide an implement for attachment to the boom structure of a vehicle, which is useful to gather and simply preposition lengths of scrap metal, quickly clip such scrap into short pieces and then easily gather, manipulate, pick up and load such pieces of scrap in a rapid and efficient manner for reprocessing.

Important features of the invention include a grapple for attachment to the boom structure of a vehicle, wherein the lower jaw of the grapple has a forwardly opening shear on the working face of the center tine located between two outside tines each of which have an angular forwardly opening bight. A top jaw with two tines swings downward into the lower jaw to orient and retain lengths of metal scrap for cutting. The outer tines of the lower jaw assist in orienting the lengths of scrap being drawn or pushed by the top jaw. The middle tine of the lower jaw has an upright mast from which a cylinder depends, to operate the movable blade of the shear.

Advantages obtained include the capability of handling and cutting of lengths of a wide variety of metal scrap without the aid of hand labor working from the ground. Wire and cable on spools can be grasped and pulled out in long lengths, then cut into manageable pieces. Wire and cable in a tangled heap or bundle can be easily reduced by using the top jaw to draw lengths of the cable into the shear. The two tines of the upper jaw cooperate with the shear to orient the lengths of scrap properly for cutting. The cable may engage one or both of the outside tines and then be properly positioned in the shear for cutting.

Unless lengths of structural steel are positioned to be directly across all the tines of the lower jaw, the top jaw will draw the steel against one outside tine and thence swing the steel as it is further drawn into the shear for cutting. The top jaw retains the scrap being cut, against the tendency of the shear to eject the scrap during cutting.

After the scrap has been cut into short pieces, the top blade of the shear may be swing up, and the lower jaw including the bladed center tine are useful in the usual way in cooperation with the upper jaw for gathering, lifting and loading the short pieces of scrap.

DETAILED SPECIFICATION

One form of the invention is illustrated in the drawings and is described herein.

The grapple shear is indicated in general by numeral 10 and is illustrated in FIG. 1 to be mounted on the boom structure 11 of a rubber tired tractor 12. Tractor 12 is of the skid wheel type with no articulation in the frame or wheel mountings. This type of tractor is extremely maneuverable in close quarters that are often encountered in a scrap reprocessing yard. It should be understood that other types of vehicles might be substituted for the tractor 12 in mounting the grapple shear 10. For instance, a tractor with articulated frame would be suitable, and in larger installations, the grapple shear 10 might even be mounted on the boom structure of a backhoe.

The grapple shear 10 has a lower jaw 13 and an upper jaw 14. The lower jaw 13 is tiltably mounted on the boom structure 11 of the tractor by pins 15 and the tilting of the lower jaw may be controlled by a hydraulic ram 16 on the boom structure and attached to the lower jaw 13 by pivot pins 17. It should be understood that alternate mounting arrangements or connecting structure between the lower jaw and the boom structure of the tractor may be provided, in order to adapt the grapple shear to various boom and tractor arrangements.

The lower jaw has three tines 18, 19 and 20 widely spaced from each other and rigidly affixed to each other by a reinforcing steel plate structure 21 extending across the rear portions of the tines and welded thereto. An additional lower structural plate 22 extends across the lower portion of the rear end of the tines and is welded thereto for additional strength. The mounting pins 15 and 17 are carried in adapter brackets 23 and 24 so as to position the lower jaw as desired relative to the boom structure 11 of the tractor.

The center tine 19 has an upright mast 37 formed integrally therewith and extending upwardly and rigidly from the rear portion of the tine 19. The mast 37 has a bracket 38 on its upper end which swingably mounts a depending hydraulic ram 39 which is suspended from a pivot pin 40 attached to the bracket 38. The extendible rod 41 of the hydraulic ram is connected by a pivot pin 42 to a bracket flange 43 on the upper edge of the shear blade 33. The hydraulic ram 39 is connected to the valved hydraulic fluid system of the tractor to be operated as desired. Similarly, the hydraulic rams 26 are also connected into the hydraulic fluid system of the tractor to be extended and retracted as desired.

It will be recognized that when the shear blade 33 is swung upwardly away from tine 19, as illustrated in FIG. 2, the blade 33 cooperates with the tine 19 in defining a shear with a forwardly opening angular bight 43 located between the bight 29 and 30 of the outer tines 18 and 20. The tines 28 of the upper jaw swing along both the tine 19 and shear blade 33 to traverse the bight 43 of the shear to cooperate with the blade 33 and tine 19 in orienting length of scrap metal being forced into the lower jaw. The angular bights 29 and 30 of the outer tines 18 and 20 also cooperate with the upper jaw 14 in orienting the length of scrap metal being pushed into the lower jaw.

As previously described herein, the grapple shear 10 is useful in cutting long lengths of scrap, whether the scrap be in the form of rigid structural members, or rigid pipes, or whether the lengths of scrap be lengths of cable or wire. The forwardly projecting ends of the tines of the lower jaw can be moved into a pile of lengths of metal scrap and the upper jaw 14 will be operated to swing toward the lower jaw and push the lengths of metal scrap into the lower jaw. The lengths of metal scrap are oriented by action of the tines of the upper jaw, acting in cooperation with the center tine 19. Because of the relation between the tines 28 of the upper jaw 14 and the central tine 19 of the lower jaw, these three tines can operate effectively (even though the outer tines 18 and 20 may be missing or omitted). In any event, the tines of the upper jaw cooperate with the shear on the center tine in orienting the length of metal scrap and the upper jaw pushes the scrap into the bight between the tine 19 and shear blade 33. The upper jaw 14 will actually retain the lengths of scrap metal in the shear as the upper blade is operated to produce the cutting of the scrap metal. When the cutting has been completed, the upper jaw is again swung away from the lower jaw to release the cut pieces of scrap.

It will also be recognized that the outer tines 18 and 20 which have the arcuate bights 29 and 30 also cooperate with the upper jaw 14 in orienting the lengths of metal scrap being drawn and pushed into the lower jaw. Depending upon the actual position of the lengths of metal scrap when they are being moved into the shear, the lengths of metal scrap will engage one or the other of the outside tines in the area of the angular bight and by inward swinging of the upper jaw, the lengths of metal scrap will be swung directly across the shear in order to be properly positioned for cutting. Cutting will desirably be produced when the upper jaw has swung into interleaved relation with the tines of the lower jaw and the tines 28 of the upper jaw traverse the angular bights 29, 30 and 43 of the outer jaws and the shear.

The rear end portions 33.1 of the shear blade 33 has an oblong recess 45 at a location opposite the rear portion 19.2 of the central tine 19. An adjustable spacer insert 46 is confined in the recess 45 and bears against the face of the rear portion of tine 19.2. A pair of adjustment and locking screws 47 are threaded into a tapped aperture in the rear portion 33.1 of the shear blade and bear inwardly against the insert 46 to urge the insert against the rear portion 19.2 of the tine. The necessary adjustment of the cutting edge 35 to maintain it in proper relation to the cutting edge 31 is obtained by adjustment of the insert 46 which tends to take up the slack of the shear blade as there may be some slight wearing in the bearing structure 34.

It will be seen that the outer tines 18 and 20 have forwardly projecting lower tip ends, and obliquely upwardly and forwardly extending upper ends 18.1 and 20.1, upon which the upper jaw 14 is swingably mounted. The upper jaw 14 has brackets 25 at both of its ends to make provision for attachment of the upper jaw to hydraulic ram 26 pivotally mounted at 27 on the outer tines 18 and 19. The piston rods of the rams are connected to the brackets 25 for swinging the upper jaw toward and away from the lower jaw 13.

It will be recognized that the upper jaw 14 has a pair of widely spaced tines 28 which have lower tip ends curved inwardly toward the lower jaw 13. The tines 28 of the upper jaw are located so as to interleave with the tines of the lower jaw and receive the central tine 19 therebetween.

The outer tines 18 have forwardly opening angular bights 29 and 30 between the forward tip ends 18.2 and 20.2 and the upper ends 18.1 and 20.1.

When the upper jaw 14 swings inwardly along the tines 18 and 20, the upper jaw traverses the angular bights 29 and 30 of the outer tines 18 and 20.

The central tine 19 has an upper edge 31 forming a cutting edge extending generally forwardly toward the tip end of the tine. The cutting edge 31 is defined by a replaceable insert or wear plate 32 removably attached to the tine by screws.

A shear blade 33 is swingably mounted on the central tine 19 by a bearing 34. The shear blade 33 lies along the side of the tine 19 and is swingable downwardly along the cutting edge 31 in a shearing type of motion. The shear blade 33 also has a cutting edge 35 which moves along the edge 31 of the central tine 19 in a shearing type action. Cutting edge 35 is defined by a replaceable hardened steel wear strip or insert 36 detachably affixed to the shear blade 33 by screws.

In FIG. 3 of the drawing, the upper jaw 14 is illustrated, in full lines, at an intermediate location of its range of swinging capabilities. The dotted position A thereof illustrates the upper jaw 14 in its upwardly swung position, as the rods of the cylinders 26 are retracted. The dotted position B of the upper jaw 14 illustrates the manner in which the upper jaw traverses the bights 29 and 30 of the outer tines 18 and 20, and traverses the bight 43 of the shear to accomplish the feeding of lengths of metal scrap into the shear and jaw and to accomplish proper orientation of such lengths of metal scrap in this process. In the dotted position B of the jaw 14, the piston rods of the cylinders 26 will have been extended.

Also in FIG. 3, the shifted dotted position of the shear blade 33 is illustrated and indicated by the letter S. It will be recognized that the shear edge 33 is swung along and passed the shear edge 31 of the central tine in this cutting operation.

It will be seen that the present invention provides a grapple shear with tines on the lower jaw, the central tine having a top cutting edge and also having a shear blade mounted on the central tine for cutting lengths of scrap metal pushed into the angular bight between the central tine and the shear blade by the top grapple jaw. The tines of the upper jaw receive the lower central tines between and cooperate therewith in orienting the lengths of metal scrap to be cut. Also, the angular bights in the outer tines of the lower jaw cooperate with the upper jaw in orienting and holding the lengths of metal scrap being cut by the shear.

What is claimed is:

1. A grapple shear for attachment onto the boom of a vehicle to reduce and handle lengths of scrap metal, comprising
   a lower jaw adapted for mounting on the boom of the vehicle and having forwardly projecting tine means to be capable of moving forwardly along the ground, the tine means including a lower tine with a top cutting edge extending toward the forward tip of the tine,
   a powered upper jaw with mounting means swingably connected to the lower jaw at a location above said tine means, the upper jaw having a pair of spaced tines which swing along said lower tine and receives said lower tine therebetween, and
   a powered shear blade lying along said lower tine and swingably mounted on the tine to swing downwardly along said top cutting edge in a shearing motion, the shear blade also swinging upwardly to cooperate with the lower tine in defining a scrap reducing shear with a forwardly opening angular bight into which such lengths of metal scrap are pushed, are oriented transversely of the lower tine and shear blade, and are held by the tines of the upper jaw.

2. The grapple shear according to claim 1 and the tines of the upper jaw having outer ends spaced from the swingable mounting and being curved inwardly toward the lower jaw.

3. A grapple shear for attachment onto the boom of the vehicle to reduce and handle lengths of metal scrap, comprising
   a lower jaw adapted for mounting on the boom of the vehicle and having forwardly projecting tine means to be capable of moving forwardly along the ground, the tine means including a pair of outer tines widely spaced from each other and having forwardly extending tip ends, and said tine means also including a central tine affixed to said outer tines and located therebetween, said central tine having a forwardly extending tip end and also having a top cutting edge extending toward the forward tip end,
   a powered upper jaw with mounting means swingably connected to the lower jaw at a location above said tines to swing into the lower jaw for gathering, pushing and orienting lengths of metal scrap rearwardly along said tines,
   and a powered shear blade lying along said central tine and swingably mounted on the tine to swing downwardly along said top cutting edge in a shearing motion, the shear blade also swinging upwardly to cooperate with the central tine in defining a scrap reducing shear having a forwardly opening angular bight into which such lengths of metal scrap are pushed, oriented and held by the upper jaw.

4. The grapple shear according to claim 3 and the top jaw having an opening intermediate its width to receive the central tine therein to accommodate an interleaving relation between the lower and upper jaws as the upper jaw pushes and orients the lengths of metal scrap into the bight of the shear.

5. The grapple shear according to claim 3 and said outer tines also having generally forwardly extending upward ends rigid with respect to the forwardly extending tip ends of the outer tines, and said outer tines also having substantially angular bights adjacent the bight of the shear and cooperating with the shear and upper jaw in orienting and holding the lengths of scrap metal for cutting.

6. A grapple shear for attachment onto the boom of a vehicle to reduce and handle lengths of metal scrap, comprising
   a lower jaw adapted for mounting on the boom of the vehicle and having forwardly projecting tine means to be capable of moving forwardly along the ground, the tine means including a lower tine with a top cutting edge extending toward the forward of the tine,
   a powered upper jaw with mounting means swingably connected to the lower jaw at a location above said tine means, the upper jaw having an opening intermediate its width to receive the lower tine therein to accommodate an interleaving relation between the lower and upper jaws as the upper jaw pushes and orients the lengths of scrap transversely of said lower tine,
   a shear blade lying along said lower tine and swingably mounted on the tine to swing downwardly along said top cutting edge in a shearing motion, the shear blade also swinging upwardly to cooperate with the lower tine in defining a scrap reducing shear with a forwardly opening angular bight into which such lengths of metal scrap are pushed, oriented and held by the upper jaw, and an upright mast affixed to the lower tine located rearwardly of the forward tip thereof, and an upright hydraulic ram connected between the top of the mast and the shear blade and swinging the blade to produce a shearing of scrap supplied by the upper jaw and to reopen the bight of the shear for orienting and receiving additional metal scrap.

7. The grapple shear according to claim 6 and the lower jaw having a bearing swingably mounting the rear end of the blade on the lower tine, the blade extending obliquely horizontally forwardly from the bearing and having an upper edge portion with means attached to the ram, the blade also having a replaceable hardened wear strip affixed thereto and forming the cutting edge of the shear blade.

8. A grapple shear for attachment onto the boom of a vehicle to reduce and handle length of metal scrap, comprising a lower jaw adapted for mounting on the boom of the vehicle and having forwardly projecting tine means to be capable of moving forwardly along the ground, the tine means including a pair of widely spaced outer tines with forwardly extending tip ends and obliquely extending upper ends, said outer tines having forwardly opening angular bights between said upper and forward ends thereof, the tine means also including a central tine between said outer tines and having a forwardly extending tip end and a top cutting edge extending toward the forward tip end, a powered upper jaw with mounting means swingably connected to the lower jaw at a location above the forwardly extending tip ends and the upper jaw having a pair of spaced tines which swing between and interleave with the tines of the lower jaw, and a powered shear blade lying along said lower tine and swingably mounted on the tine to swing downwardly along said top cutting edge in a shearing motion, the shear blade also swinging upwardly to cooperate with the lower tine in defining a scrap reducing shear with a forwardly opening angular bight into which such lengths of metal scrap are pushed by the upper jaw, the tines of the upper jaw traversing the bight of the shear and the bight of the outer jaws to cooperate with the shear and outer tines in orienting and holding the lengths of metal scrap in the shear for cutting.

9. The grapple shear according to claim 8 and the mounting means for the upper jaw being connected with the upper ends of the outer tines, hydraulic motors connected with the outer tines and with the upper jaw for swinging the jaw toward and away from the tines of the lower jaw, a hydraulic ram above the shear blade and connected thereto, and an upright mast affixed to the central tine and extending upwardly adjacent the hydraulic ram and having an upper end attached to said ram, and the tines of the lower jaw having rear end portions with rigid reinforcing structure affixed thereto, and mounting means also affixed to the rear ends of said tines for attachment to the boom of the vehicle.

* * * * *